United States Patent [19]

Zysko

[11] Patent Number: 5,355,724
[45] Date of Patent: Oct. 18, 1994

[54] OPTICALLY BROADCASTING WIND DIRECTION INDICATOR

[75] Inventor: Jan A. Zysko, Merritt Island, Fla.

[73] Assignee: The United States of America as represented by the Administrator of the National Aeronautics and Space Administration, Washington, D.C.

[21] Appl. No.: 111,320

[22] Filed: Aug. 23, 1993

[51] Int. Cl.$^5$ .............................................. G01P 13/00
[52] U.S. Cl. ............................. 73/107.06; 73/170.05; 340/949
[58] Field of Search ............... 116/202; 340/949, 953, 340/956; 73/170.06, 170.07, 170.08, 170.09, 170.11

[56] References Cited

U.S. PATENT DOCUMENTS

| | | | |
|---|---|---|---|
| 1,874,214 | 8/1932 | Werner | 73/170.06 |
| 1,879,267 | 9/1932 | Hurni | 73/170.06 |
| 1,976,706 | 10/1934 | Werner | 73/170.06 |
| 1,989,295 | 1/1935 | Sewell | 340/953 |
| 2,079,861 | 5/1937 | Keith | 340/953 |
| 2,449,480 | 9/1948 | Houck | 340/949 |
| 2,619,527 | 11/1952 | Gray | 340/949 |
| 3,164,801 | 1/1965 | Nicholl | 340/949 |
| 3,447,129 | 5/1969 | Birmingham et al. | 340/955 |
| 3,885,876 | 5/1975 | Konopka | 340/955 X |
| 3,925,704 | 12/1975 | Camic | 340/953 X |
| 4,093,937 | 6/1978 | Habinger | 340/953 X |
| 4,241,604 | 12/1980 | Hergenrother | 73/170.06 |
| 4,287,762 | 9/1981 | Baer | 73/170.06 X |
| 4,812,844 | 3/1989 | Kallstrom | 340/949 |

Primary Examiner—Richard E. Chilcot, Jr.
Assistant Examiner—Elizabeth L. Dougherty
Attorney, Agent, or Firm—William J. Sheehan; Guy M. Miller; Alan J. Kennedy

[57] ABSTRACT

An optically broadcasting wind direction indicator generates flashes of light which are separated by a time interval that is directly proportional to the angle of the wind direction relative to a fixed direction, such as north. An angle/voltage transducer generates a voltage that is proportional to the wind direction relative to the fixed direction, and this voltage is employed by timing circuitry or a microprocessor that generates pulses for actuating a light source trigger circuit first at the start of the time interval, and then at the end of the time interval. To aid an observer in distinguishing between the beginning and end of the interval, two stop flashes can be provided in quick succession. The time scale is preferably chosen so that each second of the time interval corresponds to 30° of direction relative to north. In this manner, an observer can easily correlate the measured time interval to the wind direction by visualizing the numbers on a conventional clock face, each of which correspond to one second of time and 30° of angle.

14 Claims, 2 Drawing Sheets

OPTICALLY BROADCASTING WIND DIRECTION INDICATOR

ORIGIN OF THE INVENTION

The present invention was made by an employee of the U.S. Government and may be manufactured and used by or for the government for government purposes without the payment of any royalties thereon or therefor.

BACKGROUND OF THE INVENTION

1. Field of the Invention

The present invention relates in general to a method and apparatus for optically broadcasting wind direction information.

2. Description of the Prior Art

Wind direction indicators have long been employed at airports and other facilities, for example, to provide pilots and other observers with a visual indication of wind direction and speed. Examples of prior art wind direction indicators include windsocks and vanes which unfortunately are difficult to see beyond a relatively short distance and cannot be used effectively during night or reduced visibility conditions. Attempts have been made to overcome the deficiencies of windsocks and vanes by replacing them with beacon light beam type indicators that can be seen for several miles or more. As an example, U.S. Pat. No. 1,874,214 discloses such an indicator in which a rotating light beam is modulated so that it is shut off when it is directed into the wind. A number of other patents, such as U.S. Pat. Nos. 1,879,267, 1,989,295 and 4,241,604, disclose optical wind direction and speed indicators in which light beams are flashed in the direction of the wind.

Although these prior art light beam type wind direction indicators provide a considerably longer obervation range than do windsocks or vanes, they still are difficult to read from a long distance, depending on weather conditions or the observer's relative position with respect to the indicator. What would be desirable therefore is to provide a wind direction indicator which can be observed from a long distance and can be easily interpreted regardless of weather conditions or the relative position of the observer.

SUMMARY OF THE INVENTION

It is therefore the object of the present invention to provide an optically broadcasting wind direction indicator which can be observed and interpreted from a relatively long distance, regardless of most weather conditions or the relative position of an observer.

This and other objects of the invention are achieved through provision of a wind direction indicator in which synchronized light flashes are generated, and the time interval between the flashes is indicative of the relative direction of the wind. This wind direction indicator eliminates the problems associated with previous light beam type indicators which require a clear and accurate observation of the position of the light beam to enable determination of the wind direction. With the present wind direction indicator, an observer need only observe the occurrence of the light flashes and then measure the time interval between flashes to determine the wind direction. A close inspection of the light flashes is therefore unnecessary, and an omnidirectional, high intensity light source can be employed to insure that the indicator is clearly visible from all angles of approach.

In the preferred embodiment of the present invention, a conventional wind vane and angle/voltage transducer are employed to generate the necessary wind direction proportional electrical outputs for operating the indicator. The electrical output of the angle/voltage transducer is digitally converted and employed to control operation of digital timing and trigger circuitry for a high intensity strobe light. The timing circuitry causes the strobe trigger circuit to first generate a single start light pulse, followed by two stop light pulses which occur at a time after the start pulse that is directly proportional to the measured wind angle relative to north. The start pulse/stop pulse cycle then repeats itself after a preset time delay.

BRIEF DESCRIPTION OF THE DRAWINGS

The objects, features and advantages of the present invention will become apparent from the following detailed description of a preferred embodiment thereof taken in conjunction with the accompanying drawings in which.

DETAILED DESCRIPTION OF A PREFERRED EMBODIMENT

Figure 1:
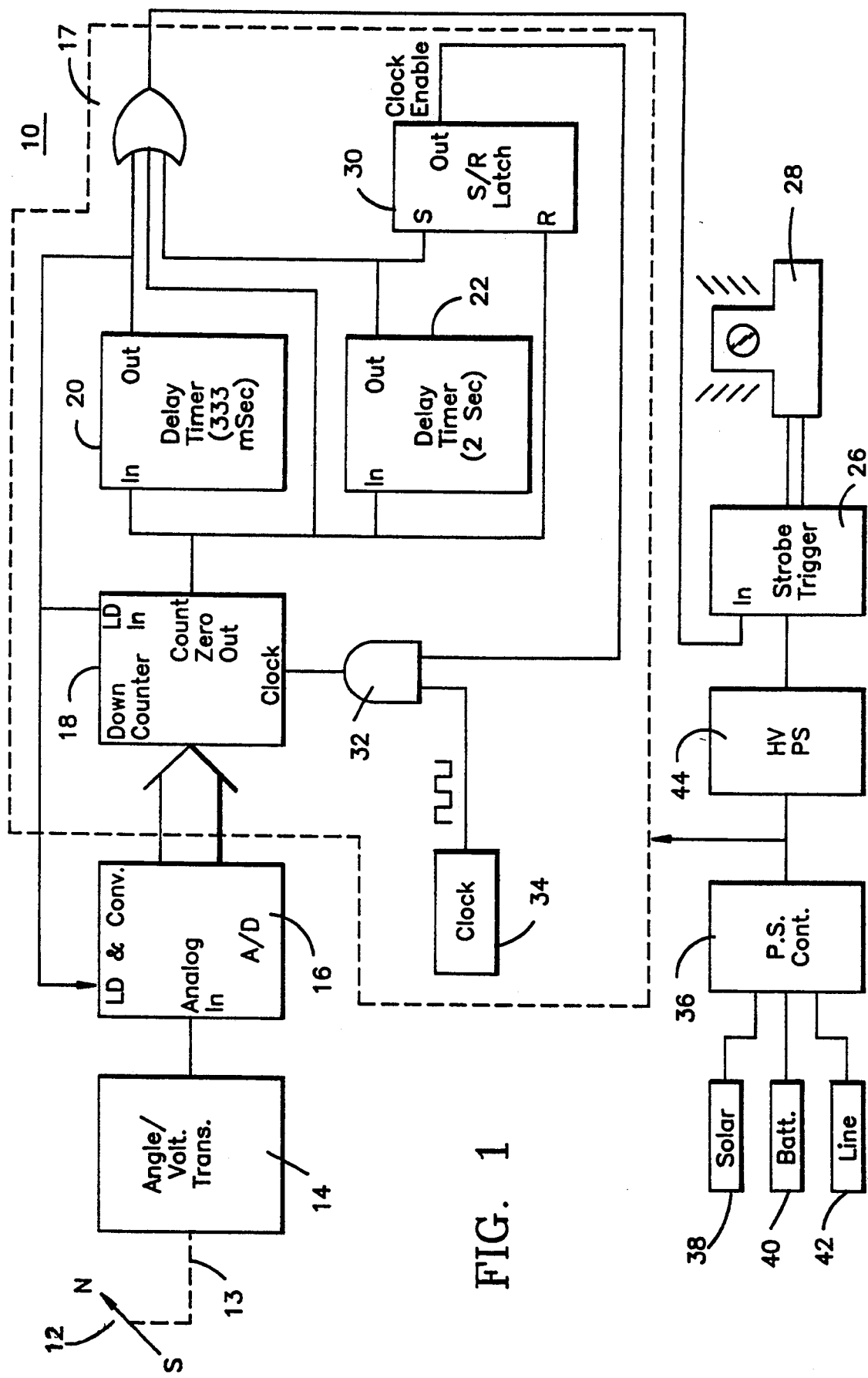
FIG. 1 is a schematic block diagram of a circuit which forms a preferred embodiment of the present invention.

Turning now to a more detailed consideration of a preferred embodiment of the present invention, FIG. 1 illustrates an optically broadcasting wind direction indicator circuit 10 including a conventional vane type wind direction sensor 12 which is mechanically connected through a rotatable shaft 13 to a conventional angle/voltage transducer 14. The transducer 14 generates a voltage output that is directly proportional to the sensed angle of the wind direction relative to a reference direction, such as north. The voltage output from the angle/voltage transducer 14 is fed into an A/D converter 16 which generates a digital output that is directly proportional to the sensed angle of the wind direction sensor 12. By way of example, the voltage values of the angle/voltage transducer 14 can be chosen for convenience so that as the wind direction sensor 12 varies from 0 to 360° from north, the digital count output from the A/D converter will vary from 0 to 360, although the scaling can be adjusted to meet any desired requirements.

The digital output from the A/D converter 16 is connected to the digital inputs of a timer controller circuit 17 which is illustrated in FIG. 1 as being comprised of a plurality of discrete logic and timing elements. It will be understood, however, that the timer controller circuit 10 can also be easily implemented using a conventional microprocessor that is programmed to carry out the functions of the various circuit elements described in greater detail hereafter.

In the hardware version of the timer controller circuit 17 as illustrated in FIG. 1, the digital count output from the A/D converter 16 is fed into the inputs of a binary down counter 18. The COUNT ZERO output of the binary down counter 18 is connected to the TRIGGER inputs of a first, short (e.g., 333 millisecond) delay timer 20 and a second, long (e.g., 2 second) delay timer 22. The output of the first, short delay timer 20 is connected both to the LOAD input of the binary down counter 18 and the LOAD AND CONVERT input of the A/D converter 16 to trigger loading and converting operations in these two devices periodically.

The COUNT ZERO output from the binary down counter 18 and the outputs from the first and second delay timers 20 and 22 are also connected to a three input OR gate 24 which generates a STROBE TRIGGER output. The STROBE TRIGGER Output is connected to a strobe trigger circuit 26 that powers a high intensity omnidirectional strobe light 28. The output of the second, long delay timer 22 is also connected to the SET input of a set/reset latch 30 which generates a clock enable signal that is fed through to a first input of an AND gate 32. Clock pulses are also fed from a clock circuit 34 to a second input of the AND gate 32 which are fed to the CLOCK input of the binary/down counter 18 during the time when the set/reset latch 30 is set. The COUNT ZERO output of the binary/down counter 18 is also connected to the RESET input of the set/reset latch 30.

To provide power to the various elements of the circuit 10, including the high intensity strobe light 28, a power supply controller 36 is provided which receives power from any suitable source or sources, such as a solar panel 38, a battery 40 and/or line power 42. The power supply controller 36 generates a regulated output which is connected to the various logic circuit elements, as well as to a high voltage power supply 44 which supplies high voltage to the strobe trigger circuit 26 and the high intensity strobe light 28.

Figure 2:
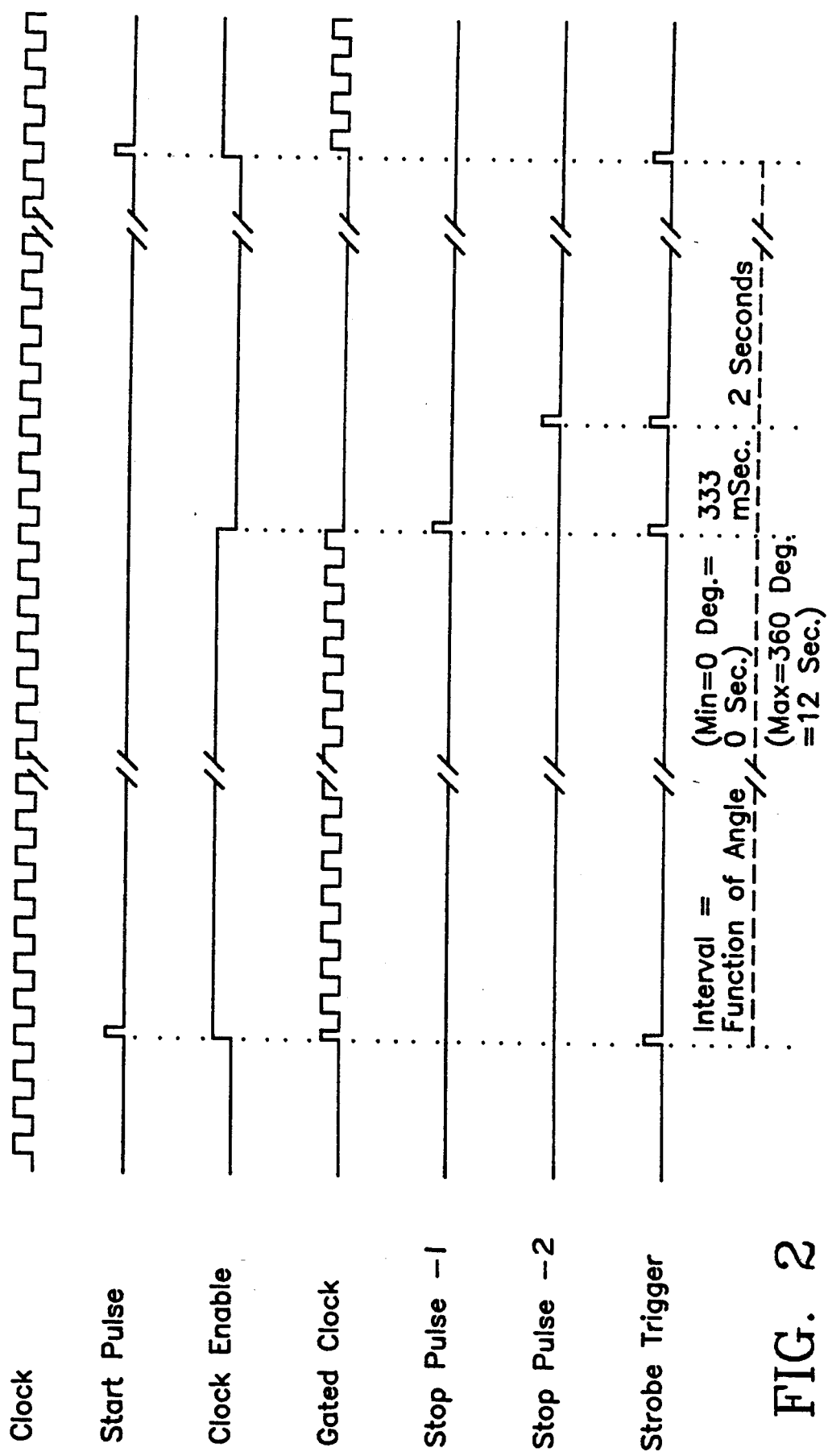
FIG. 2 is a timing diagram for the circuit of FIG. 1.

The operation of the circuit of FIG. 1 will now be described and reference should be made to the timing diagram of FIG. 2 in this regard. The wind direction sensor 12 essentially acts as a potentiometer when connected to the angle/voltage transducer 14. As the wind direction sensor 12 rotates in the wind, the angle/voltage transducer 14 generates a voltage output that is directly proportional to the angle of the wind direction sensor 12 with respect to north. This voltage output is then applied as the analog input to the A/D converter 16 which converts the voltage to a corresponding digital output. This digital output is then loaded into the binary/down counter 18.

Upon the occurrence of a start pulse output from the second, long delay timer 22, which occurs either when the circuit 10 is first turned on, or 2 seconds after a COUNT ZERO output is generated by the binary down counter 18, a pulse is sent to the strobe trigger circuit 26 which causes the strobe light 28 to flash. At the same time, the set/reset latch 30 is set so that the CLOCK ENABLE output goes high and clock pulses are allowed to pass through the AND gate 32 to the CLOCK input of the binary down counter 18. This causes the binary down counter 18 to begin counting down towards 0 from the initial digital value loaded therein from the A/D converter 16. When the binary down counter 18 reaches 0, a stop pulse is generated on the COUNT ZERO output which triggers operation of the first and second delay timers 20 and 22. At the same time, this stop pulse is passed through the OR gate 24 to the strobe trigger circuit 26 which causes the strobe light 28 to again flash, thus signalling the end of the time measurement interval. Also, a pulse is sent to the RESET input of the set/reset latch 30 which drops the CLOCK ENABLE output low and thereby ceases the flow of clock pulses to the binary down counter 18.

Approximately 333 milliseconds (or any other selected time period) after the first delay timer 20 is triggered by the COUNT ZERO output of the binary down counter 18, another stop pulse is generated by the short delay timer 20 which is also passed through the OR gate 24 and causes the strobe trigger circuit 26 to actuate the strobe light 28 for the second stop flash. The use of two closely spaced stop flashes helps the observer distinguish between the beginning and end of the time measurement interval. The process is kept from repeating for approximately 2 seconds by the long delay timer 22. When the long delay timer 22 times out, it generates a start pulse which sets the set/reset latch 30 and also causes the strobe trigger circuit 26 to flash the strobe light 28, and thus the cycle repeats itself.

In the above manner, the time interval between the flashing of the start pulse and the flashing of the first stop pulse by the strobe light 28 will be directly proportional to the digital count that is loaded in the binary down counter 18, which in turn is directly proportional to the angle of the wind direction sensor with respect to north. Thus, the time interval between flashes when the sensor is pointing south will be twice as long as the time period between flashes when the sensor is pointing east, and so forth. If the wind direction is due north, then a 0 will be loaded in the binary down counter 18 which has the effect of causing the start pulse and first stop pulse to be effectively superimposed onto one another so that only the two stop pulses will be effectively generated.

Although the clock rate of the circuit. 17, voltage output scale of the angle/voltage transducer 14 and conversion scale of the A/D converter 16 can be chosen to provide any desired time scale and resolution for the range of wind direction measurements from zero to 360° one preferred scale is to make every second of time between the start and first stop flashes to be equal to 30°. This scale provides a range of time intervals (0–12 seconds) that provides a reasonable level of precision without requiring excessive observation time. In addition, a 12 second full range time interval is very easy and convenient to read because each one second count corresponds to one of the standard 12-hour positions on a clock. Thus, a three second time interval would correspond to winds from the 3 o'clock position which is 90° from north and is therefore due east, a six second interval would equate to winds from the 6 o'clock position or due south and so on. Thus, an observer can approximately determine the wind direction by estimating the time interval using the "one-thousand-one, one-thousand-two" counting method and relating the total end count to the corresponding o'clock position. If a more accurate measurement is required, stop watch timing could yield a precision to 1° or better.

In summary, the present invention provides a wind direction indicator which both provides a much extended reading range over conventional wind socks or weather vanes, but at the same time is easy to read. Under typical viewing conditions, the flashes from the high intensity strobe light should be observable from distances of five miles or more. The wind direction indicator is designed so that it is completely self-contained requiring no connection or wiring to other equipment or facilities. The primary power demands of the unit are minimal and sustainable by battery and/or solar power. Further, the self-contained nature of the design lends itself to adaptation to existing passive wind direction sensors, such as windsocks, airport tetrahedrons or wind vanes.

Although the invention has been described in terms of a preferred embodiment, it will be understood that numerous other variations and modifications could be made thereto without departing from the scope of the invention as set forth in the following claims. For example, any suitable conventional averaging or filtering scheme could be employed to help smooth out the effects of turbulent winds so that the average wind direction over a period of time would be indicated to provide a more reliable reading in such conditions.

What is claimed is:

1. A method for optically indicating wind direction comprising the steps of:
   a) determining wind direction relative to a fixed direction; and
   b) actuating a light source to generate first and second flashes which are spaced in time in proportion to the angle of the determined wind direction relative to the fixed direction;
   c) determining the angle of the wind direction relative to the fixed direction by visually observing the time interval between the first and second flashes of the light source.

2. The method of claim 1 wherein the step of determining wind direction relative to a fixed direction further includes generating an electrical signal which is proportional to the angle of the wind direction relative to a fixed direction.

3. The method of claim 2, wherein the step of actuating a light source further comprises:
   i) converting said electrical signal to a proportional digital value which is also proportional to the angle of the wind direction relative to the fixed direction;
   ii) loading a timing circuit with said digital value which determines a time interval that is proportional to said digital value;
   iii) actuating said light source to generate said first flash at the beginning of said time interval;
   iv) counting down said digital value toward zero during said time interval; and,
   v) actuating said light source to generate said second flash at the end of said time interval when said timing circuit has counted down to zero.

4. The method of claim 3, wherein the step of actuating a light source further comprises actuating said light source to generate a third flash immediately following the generation of said second flash, wherein said first flash represents the start of the interval, said second flash represents the end of said time interval and said third flash helps an observer distinguish the first flash from the second flash.

5. The method of claim 3, wherein the step of loading said timing circuit further comprises generating a time interval in proportion to the angle of the determined wind direction relative to the fixed direction in which each second of time corresponds to 30° of direction relative to said fixed direction.

6. The method of claim 1, wherein the step of actuating a light source further comprises actuating said light source to generate a third flash immediately following the generation of said second flash, wherein said first flash represents the start of a time interval that is proportional to the angle of the determined wind direction relative to the fixed direction, said second flash represents the end of said time interval and said third flash helps an observer distinguish between said first and second flashes.

7. The method of claim 1, wherein the step of actuating said timing circuit further comprises generating a time measurement interval in proportion to the angle of the determined wind direction relative to the fixed direction in which each second of time corresponds to 30° of direction relative to said fixed direction.

8. An optical wind direction indicator comprising:
   a) means to determine the angle of the wind direction relative to a fixed direction;
   b ) a light source; and,
   c) means to actuate said light source in response to the determined wind direction angle to generate first and second flashes which are spaced by a time interval proportional to the determined wind direction angle relative to the fixed direction;
   whereby, the wind direction angle relative to the fixed direction is determined visually by observing the time interval between the first and second flashes of the light source.

9. The wind direction indicator of claim 8, wherein said means to determine the wind direction further comprises means to generate an electrical signal having a magnitude which is proportional to the wind direction angle relative to the fixed direction 10. The wind direction indicator of claim 9, wherein said means for actuating said light source further comprises:
   i) means to convert said electrical signal to a digital value which is also proportional to the wind direction angle relative to the fixed direction;
   ii) timing means responsive to said digital value for generating a time interval proportional to said digital value; and,
   iii) light source control means responsive to said timing means for flashing said light source at the beginning of said time interval and then at the end of said time interval.

11. The wind direction indicator of claim 10, wherein said time interval is chosen so that every second of time is equivalent to 30° of wind direction.

12. The wind direction indicator of claim 10, wherein said means to actuate said light source further, comprises means to generate a third flash immediately following said second flash to distinguish between the first flash which is indicative of the start of the time measurement interval and the second flash which is indicative of the end of the time measurement interval.

13. The wind direction indicator of claim 8, wherein said means to actuate said light source further comprises means to generate a third flash immediately following said second flash to distinguish between the first flash which is indicative of the start of the time measurement interval and the second flash which is indicative of the end of the time measurement interval.

14. The wind direction indicator of claim 8, wherein said time interval is chosen so that every second of time is equivalent to 30° of wind direction.

* * * * *